United States Patent
Hoeberigs

[15] 3,685,432
[45] Aug. 22, 1972

[54] AUTOMATIC VENDING MACHINE FOR COOKED OR FRIED FOOD PRODUCT PARTICULARLY FOR FRENCH-FRIED POTATOES

[72] Inventor: Jean Marie Mathieu Hoeberigs, 56 Eeuwfeestlaan, B 8390 Heist-Duinbergen, Belgium

[22] Filed: March 12, 1971

[21] Appl. No.: 123,727

[30] Foreign Application Priority Data

March 13, 1970 Belgium....................86412

[52] U.S. Cl. ...................99/357, 99/355, 99/404, 99/407, 99/443 C, 221/150 HC
[51] Int. Cl..............................................A47j 37/12
[58] Field of Search....99/355, 357, 404, 407, 443 C; 221/150 AC, 150 A

[56] References Cited

UNITED STATES PATENTS

| 3,448,677 | 6/1969 | Dexters | 99/407 X |
| 3,274,920 | 9/1966 | Benson | 99/404 |
| 3,398,672 | 8/1968 | Hoeberigs | 99/404 |
| 3,132,949 | 5/1964 | Crowe | 99/355 X |

*Primary Examiner*—Billy J. Wilhite
*Attorney*—Stevens, Davis, Miller & Mosher

[57] ABSTRACT

An automatic vending machine for freshly cooked food products with a conveyor provided with partitioned holders for the food products and a frying kettle. A supply funnel divided into compartments which are each closed by a separately-operatable flap, is provided between the conveyor and the kettle. A tipping device reverses the conveyor holders above said funnel.

29 Claims, 7 Drawing Figures

INVENTOR
JEAN MARIE MATHIEU HOEBERIGS

INVENTOR
JEAN MARIE MATHIEU HOEBERIGS

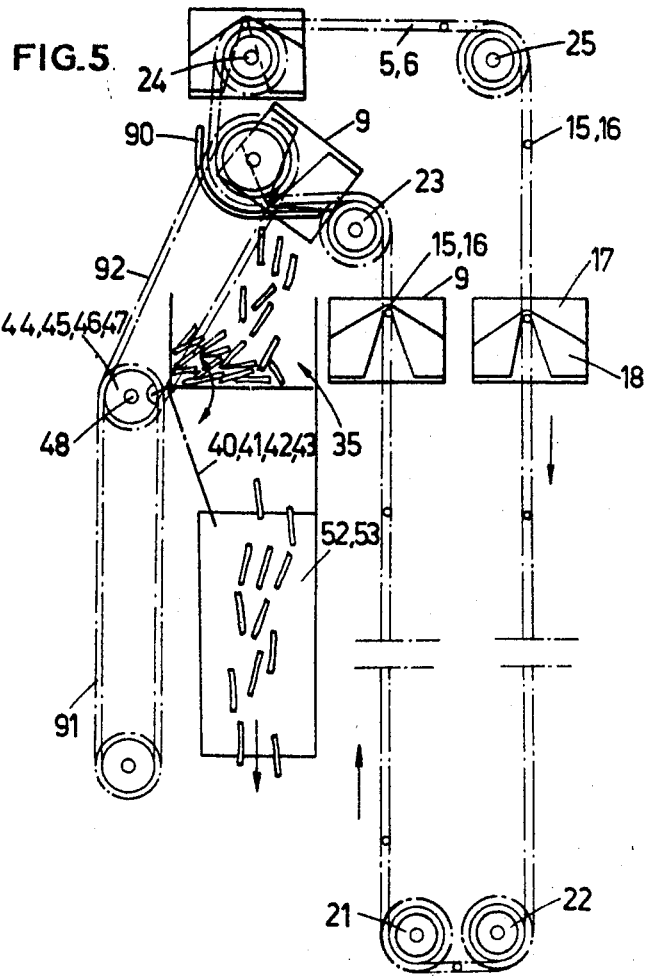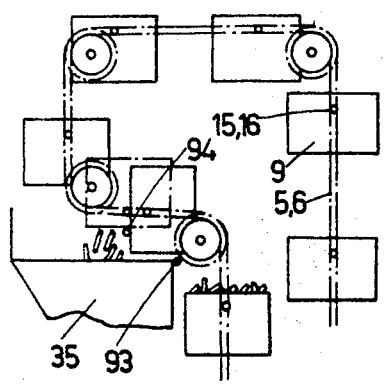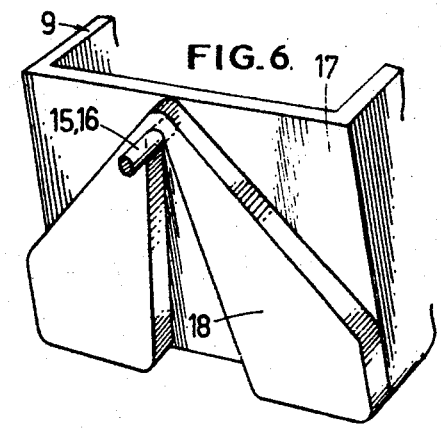

AUTOMATIC VENDING MACHINE FOR COOKED OR FRIED FOOD PRODUCT PARTICULARLY FOR FRENCH-FRIED POTATOES

This invention relates to an automatic vending machine for cooked or fried food products, particularly for French-fried potatoes, with a conveyor provided with holders for separate portions of food products to be cooked and which is movable step by step along a closed path, and at least one heated kettle for frying fat in which dips at least one frying basket, whereby means are provided on the one hand for supplying to the frying basket the food products to be fried which are brought by the conveyor, and on the other hand for feeding the products fried in said basket inside a container to a window.

The invention has for object to provide an improved automatic vending machine for food products which allows to pile up inside a minimum of space the highest possible number of food product portions to be cooked, and which further allows to obtain in a minimum of time a freshly-cooked portion of food products.

For this purpose, the holders are subdivided into adjacent compartments which may each contain a portion of food product to be cooked, and at least one supply funnel which is also divided into similar adjacent compartments, is provided at a level lying between the level of part at least of the conveyor and the level of the lower-lying frying kettle, whereby said last compartments are each closed underneath by a separate flap and whereby a tipping device for reversing the holders about a substantially horizontal rotating axis cooperates with a holder and that conveyor part which is located above the funnel level, whereby further means are provided for under the influence of gravity, on the one hand directing each one of the portions from a tipped holder to a corresponding funnel compartment and on the other hand, through an open flap, for bringing the concerned portion to the frying kettle, said flaps being each operatable separately according to a predetermined programme.

Usefully the holders are removably mounted on the conveyor.

In an advantageous embodiment, the path followed by that part of the conveyor which moves above the supply funnel level, has an horizontal movement component, whereby adjacent said path is mounted the tipping device which has a fixed stop member lying below said path, on the way followed by the holders, in such a way that said holders during the displacement thereof along the path direction engage said fixed member and perform a tipping movement about the horizontal rotating axis thereof, whereby means are provided to retain the tipped holders in such position during a determined period of time.

In a particular embodiment of the invention, the automatic vending machine comprises a conveyor for at least two frying or cooking devices, so as to allow by means of one and the same vending machine, to fry or cook simultaneously different portions of food products, which may or not be of different kinds. In this way it is thus possible with a single vending machine to prepare in a minimum of time, a complete meal, for instance French fries with meat.

Other details and features of the invention will stand out from the description given below by way of non limitative example and with reference to the accompanying drawings, in which:

FIG. 5 is a diagrammatic front view, partially in section, of a second embodiment of a vending machine according to the invention.

FIG. 6 is a perspective view of part of a holder from the vending machine shown in FIG. 5.

FIG. 7 shows a detail of part of a third embodiment of a vending machine according to the invention.

In the various figures, the same reference numerals pertain to similar elements.

The vending machines according to the invention have for object to supply to a window in a minimum of time, by introducing of a coin in a control device, a desired number of portions of freshly-cooked, warm food products such as fried potatoes, meat, fish, etc. contained in a throw-away container.

Figure 1:
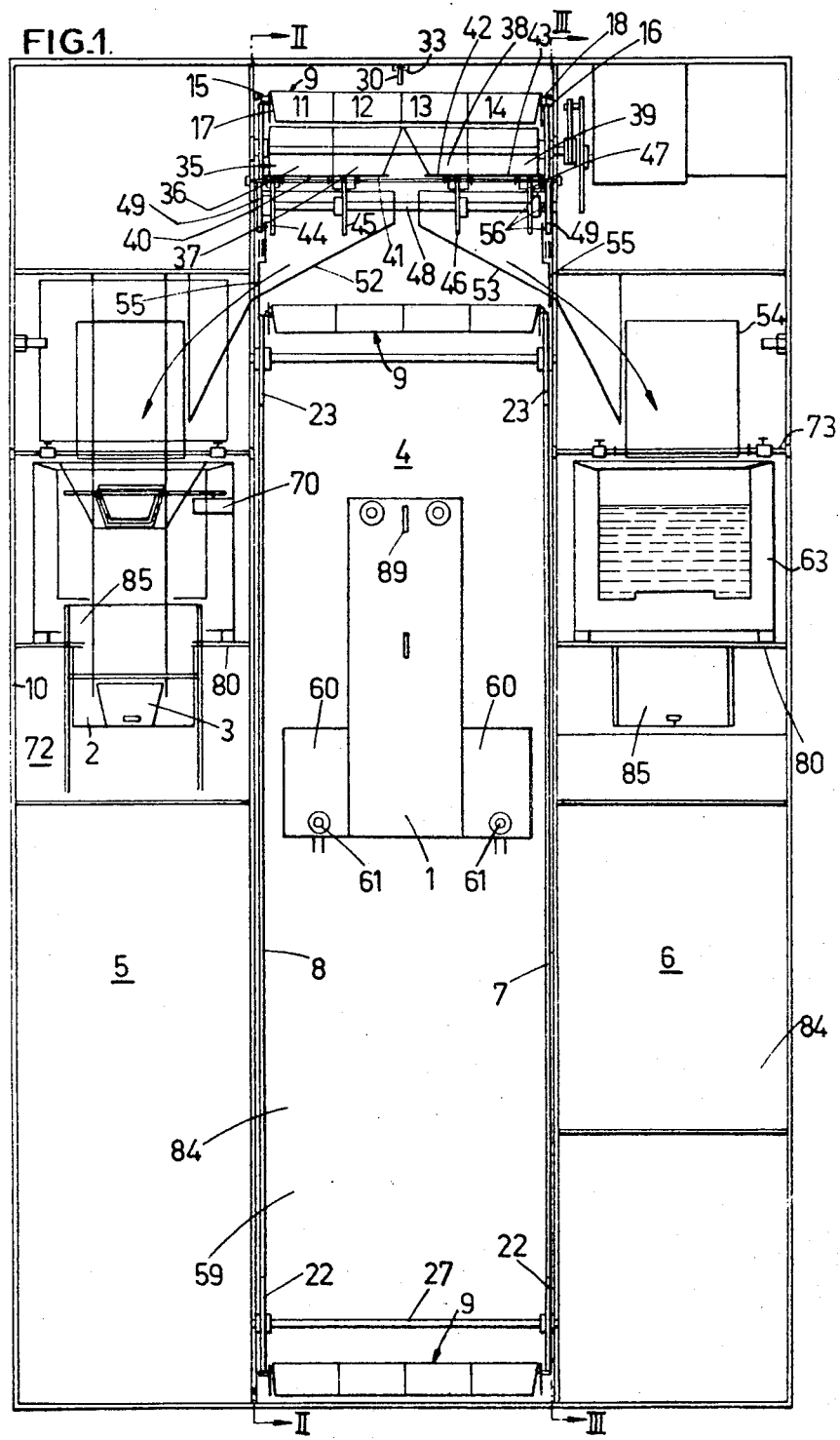
FIG. 1 is a diagrammatic front view of a first embodiment of the vending machine according to the invention.
Figure 2:
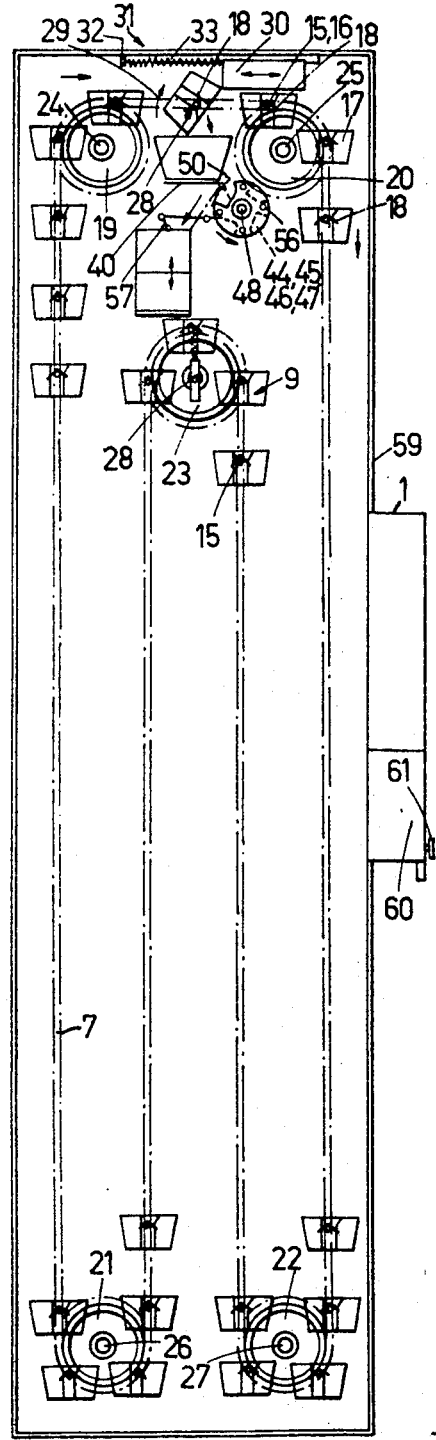
FIG. 2 is a section view along line II—II of FIG. 1.
Figure 3:
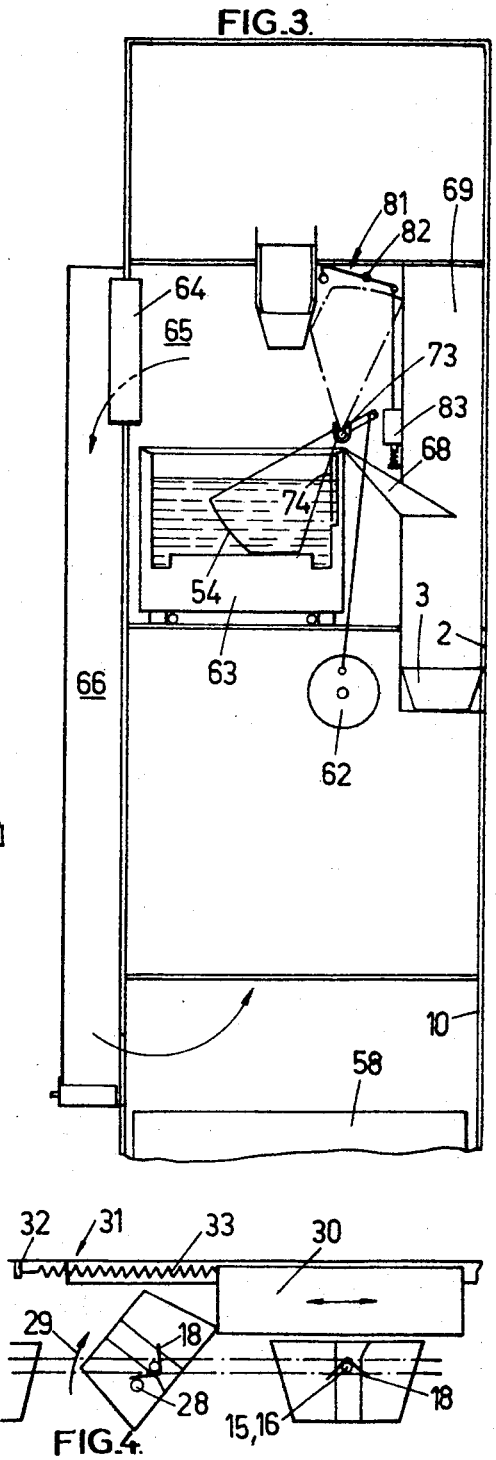
FIG. 3 is a section view along line III—III of FIG. 1.

The vending machine shown in FIGS. 1 to 3 is comprised of three sections which are completely separated from one another: a conveying or feeding section 4 and two cooking or frying sections 5 and 6 which lie on either side of the conveying section 4.

The conveying or feeding section 4 is comprised of two movable chains which lie in parallel relationship each in a vertical plane, and of a series of holders 9 which are removably hung between chains 7 and 8.

Each holder 9 is subdivided into four compartments 11, 12, 13 and 14 which may each contain a portion of food products to be cooked or fried.

Said holders 9 each hang freely rotatably about an horizontal axis, on two facing horizontal pins 15 and 16 which are attached sidewise to the chains 7 and 8, at right angle to the vertical planes in which said chains move. Said rotating axis lies above the center of gravity of each holder, in such a way that when said holders hang freely, they automatically take the normal upright position thereof, with the filling opening at the top and the bottom downwards.

On the outer side of both side walls 17 of the holders 9 which face the chains, is provided a projecting bearing member 18 which is approximately in the shape of an inverted V, the legs of which that determine a slot-like hollow space, enclose said pins 15 and 16 on the chains 7 and 8, said bearing member 18 resting freely on said pins by the location where the legs meet.

Each one of the chains 7 and 8 passes over gear wheels 19 to 23, whereby two corresponding gear wheels from said chains are made fast to the same shaft 24 to 27, respectively, in such a way that said chains completely cooperate with one another and the holders 9 which hang therebetween always remain horizontal during the chain movement.

At the top of the conveying or feeding section 4, the chains move along a path which has an horizontal movement component. In the embodiments shown in the drawings part of said path is itself horizontal and the horizontal movement component thus coincides with the resulting movement component.

Figure 4:
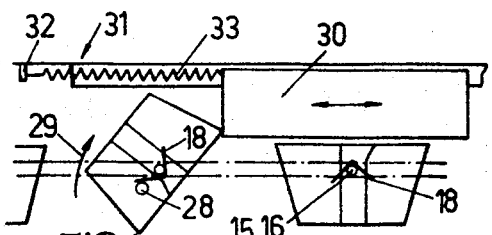
FIG. 4 shows a detail of part of the vending machine shown in FIGS. 1-3.

A fixed stop member in the shape of a small rod 28, is provided in the uppermost part of section 4, below the horizontal portion of each chain on the way followed by the bearing members 18, in such a way that when, by the movement of a holder 9, the bearing members 18 thereof engage the small rods 28, said holder 9 undergoes a tipping movement about the pins 15 and 16, along the direction of arrow 29 as shown in FIG. 4. FIG. 4 shows in detail and on a larger scale, a tipping device for the holders 9.

So as to allow to retain the thus tipped holder in such a position during a determined period of time, with the purpose of emptying completely said holder and to obviate said holder leaving the pins 15 and 16, a supporting member 30 movable along the movement direction of the chains has been provided. Said supporting member lies on the upper side of the horizontal part of said chains, behind the stop member when considered along the chain movement direction. After the holder 9 has undergone through the stop member 28, a tipping movement, it is supported in such a position by the member 30 which moves together with the holder over a determined path length, as long as the bearing member 18 rests on the small rod 28 as shown in FIG. 4. The supporting member is connected by means of a return spring 31 to a fixed point 32 and said member slides inside a rail 33 which is in parallel relationship with the chains. Due to said spring 31, the supporting member 30 returns the tipped holder to the normal straight position thereof after the bearing member 18 of said holder has left the small rod 28.

Below said tipping device is arranged a funnel 35 which is also subdivided into four compartments 36, 37, 38 and 39, whereby each compartment 36-39 is closed by a movable flap 40, 41, 42 and 43. Said various flaps may be operated separately from one another through cams 44, 45, 46 and 47 respectively, which are secured to a shaft 48. Each flap 40-43 is hinged separately about an axis 50 while a lever 51 is made fast to each said flaps and cooperates with the corresponding cam which lies below the flap to be operated.

Said cams are all the same and are formed by a disk in which is provided a notch. During the rotating of some particular cam about the axis thereof, the free end of the lever 51 cooperating therewith slides on the cam edge in such a way that when the lever slides over the circular part of said edge, the flap remains closed and when said lever enters the cam notch, the flap is automatically opened by gravity. Said grooves or notches provided in the cams 44-47 are shifted relative to one another by an angle of 90°, in such a way that by a revolution of the cam shaft 48, but one flap is opened at each quarter turn. The cam shaft is driven by means of a gear wheel 48 which meshes with the gear wheels 23 over which run the chains 7 and 8. Thus the opening and closing of the flaps is synchronous with the chain movement. The spacing between two succeeding holders on said chains 7 and 8 is such that a holder is tipped above the funnel 35 after each complete revolution of the cam shaft 48, thus after the opening and closing of all of the flaps 40-43.

Below the compartments 36 and 37 of the funnel 35 is provided a guide surface 52 which allows to direct the food products to be fried or cooked, through one of said flaps 40 or 41, towards the frying basket 54 of the frying section 5. In the same way a guide surface 53 is mounted below the compartments 38 and 39 of the funnel 35 and allows to direct fried food products towards the frying basket 54 of the frying section 6. Each one of said guide surfaces 52 and 53 is shut off from the corresponding frying section 5 and 6 by a vertical movable gate 55 which is operated in synchronism with the movable flaps of the funnel 35 and which is only opened when a flap is open and a portion of food products to be fried is discharged on the corresponding guide surface. For this purpose, on the circumference of the gear wheel 49 are provided pegs 56 which are staggered over 90° in the same way as the notches in cams 44-47, and which cooperate with a lever device 57 which causes the gate 55 to move up and down.

In the feeding or conveying section 4 is arranged a cooling device 58 to insure the keeping of the food products to be cooked or fried, which are located in the holders 9.

Inside each one of said frying sections 5 and 6 is arranged a frying kettle 63 which bears freely on a braket 80 and which is thus easily removable from the vending machine for cleaning thereof. The frying basket 54 is removably mounted relative to the frying kettle 63 and it is rotatable about an horizontal axis 73 which is provided on the edge of said kettle 63. A metal discharge chute 68 which extends from that edge where the basket 54 is mounted and slants downwards therefrom, receives the fried food products by the tipping of the basket about the axis thereof. Said chute 68 is provided on the upper edge thereof with a metal extension part 74 which extends down into the hot oil in the frying kettle. Below the axis 73 said extension part 74 slants towards the inner side of kettle 63 and thus allows to return the grease taken along by the fried food products, back to the frying kettle. Due to said extension part 74 dipping in the oil, said part together with the chute 68 proper is heated, whereby fat solidifying on the chute is prevented. The frying basket 54 is swung in and out of the fat inside the frying kettle, about axis 73, by means of an eccentric 62 which is driven from a motor not shown.

A hammer 81 is mounted above the frying kettle 63 and enables when the frying basket 54 has been rotated completely out of the kettle, to beat on the basket bottom to insure that all of the fried food products, even the ones which cling to the basket, are removed from the basket. Said hammer is rotatable about a fixed shaft 82 and it is driven by an electromagnet 83 which is alternately energized, whereby an alternating up and down motion is imparted to a free end of said hammer.

Finally a closed air-circulating system is provided inside each frying or cooking section. In this connection, a filter 64 is mounted in front of a fan not shown which sucks the hot gases and vapors from the cooking room of the frying sections 5 and 6, whereby an upright pipe 66 is connected below the fan and the filtered gases and vapors cool therein, in such a way that the moisture taken along condenses on the pipe walls and is collected in a small trough 67 below said pipe. The fan then sucks the cleaned and cooled gases again through the cooking room.

The feeding or conveying section 4 is arranged together with the two frying or cooking sections 5 and 6 inside a prismatic case 10. On the front wall 59 which is shown as being transparent, of the feeding and conveying section 4 is provided a small housing 1 inside which are arranged the control device as well as supplies of spices, mayonnaise and similar which may be added to the fried food products. Thus a salt strewer 60 has been mounted in the housing 1 and said strewer is operated through a knob 61. According to the invention, said salt strewer together with a timer not shown for determining the duration of the strewer working, is operated from the motor which drives the eccentric 62 of the frying basket 54.

The front sides of the two frying sections 5 and 6 are each closed by a door 84 which has also been shown as being transparent.

On the inner side of said doors 84 is mounted a device 72 for automatically supplying containers 3 to a window 2 which is cut out in the doors 84 and which may be closed by a vertically-movable gate 85. Said device comprises a vertical shaft 69 wherein the containers 3 are stapled and may be disengaged one by one by means of a motor 70 so as to slide down the shaft to the front of window 2. Above said window in the shaft side wall opens the discharge chute 68 over which the fried food products are dumped by the frying basket 54.

A control device not shown which is mounted inside the vending machine and which is energized by introducing a coin in a slot 89 of the housing 1, opens one of the flaps of the funnel 35, imparts to the chains 7 and 8 a movement over a determined distance, opens the gate 55 of the guide surfaces 52 or 53 so as to allow a portion of food products to be fried to reach the frying basket, starts the frying time, and operates the eccentric 62 after the running out of said time so as to dump the thus-fried portion on the discharge chute 68, which portion is then led in the shaft 69 where in the meantime by means of motor 70, a container has been disengaged to slide down in front of the window and in which the fried food products thus fall. When the frying basket has been rotated completely out of the kettle, the hammer 81 is automatically energized to insure complete emtying of said basket.

The installation described above thus allows to prepare in a minimum of time a complete meal, for instance by frying French fries in the one frying section and simultaneously frying or cooking meat, fish or similar in the other frying section.

The arrangement according to the invention of the funnel between the conveyor and the frying kettle makes the operation of the vending machine particularly flexible, among others because by tipping of one and the same holder, different portions of food products to be cooked or fried may simultaneously be brought each inside a separate compartment adjacent to the frying kettle and said portions may then slide in a minimum of time in said kettle. Thus substantially immediately after introducing a coin in the slot 89, frying of a food product portion may be started and no time is lost in moving a holder towards the tipping device and reversing thereof above a guide surface which then feeds the food products to be cooked of fried to the kettle. The above-described vending machine further enables by a suitable arrangement of the control of the flaps closing the funnel, to make a selection between four different kinds of food products, if it is assumed that each one of the compartments contains a different food product. Thus in the case of a complete meal, it is even possible to compose one's menu.

In FIG. 5 has been shown another embodiment of the above-described vending machine.

This embodiment essentially differs from the vending machine shown in FIGS. 1 to 4 by the course followed by the chains 7 and 8, by the shape of the bearing member 18 of holder 9, and by the design of the tipping device.

As in the case of the vending machine shown in FIGS. 1 to 4, the tipping device is located adjacent an horizontal part of chains 7 and 8. The course followed by the chains in FIG. 5 differs however relative to FIGS. 1 to 4 in the holders 9 after being tilted over above the funnel 35, undergoing a further rising movement and being gradually returned to the normal upright position thereof during said movement. This allows a somewhat simpler tipping device to be used as compared with the device shown in detail in FIG. 4.

Below the horizontal part of the chains lying above the funnel 35 is provided a guide member 90 which is formed by a supporting strip which extends with a substantially constant spacing relative to the horizontal part of the chain and which is extended along the upwardly-curved part thereof, in such a way that the supporting stip is approximately of L shape.

The bearing members 18 which are provided on those holder sides facing the chains 7 and 8 also form an inverted V and bear in the same way as described above for FIGS. 1 to 4, on the pins 15 and 16. The shape and size of the bearing member 18 shown in FIG. 5 and in more detail in FIG. 6, are somewhat different from the shape and size of the bearing member shown in FIG. 1 to 4, but the working thereof is substantially the same.

Before having the holders moving along an horizontal direction above the funnel 35, said holders undergo a vertically-rising motion. The change of direction occurs round the gear wheel 23.

Due to such change of direction, the outer edge of the front leg of the V-shaped bearing member 18 engages the front edge of the supporting strip 90, whereby the holder undergoes a rotation about the axis of pins 15 and 16. By the further movement of the chains along said horizontal path said front leg of the bearing member 18 slides over the supporting strip 90 and the holder is thus retained in tipped condition during a determined period of time and over some distance, in such a way that said holder is completely emptied above the funnel 35. By the further movement along the supporting strip 90, during the holder rising movement, said holder is gradually returned to the normal straight position.

To the contrary of what is the case for the vending machine shown in FIGS. 1 to 4, the cam shaft 48 is directly driven through a chain drive 91 from a stepping motor not shown. The chains 7 and 8 are driven from the cam shaft 48 by means of another chain drive 92. The relative movement of the cams mounted on the shaft 48 and of the chains 7 and 8 may be considered as similar to the movement in the vending machine as shown in FIGS. 1 to 4.

Finally FIG. 7 shows still another embodiment of a tipping device. In this embodiment the projecting bearing member is replace by a simple hole in the side walls of the holders, through which holes pass the pins 15 and 16. The holders may still be considered as removable due to the flexibility of said side walls.

The tipping device is comprised of two succeeding small horizontal rods 93 and 94 which are located some well-determined distance away from the chains, in such a way that by the movement of said chains 7 and 8, the holder when engaging the first rod 93 undergoes a 90° slanting and when meeting the rod 94, said holder is completely rotated over 360° to then return to the original upright position. This embodiment is thus very simple.

The flaps may further be provided with a return spring which closes automatically the compartment bottoms after opening thereof.

It must be understood that the invention is in no way limited to the above embodiments and that many changes may be brought therein without departing from the scope of the invention as defined by the appended claims, notably as regards the control of the various machine members, the number of conveyors and the number of frying or cooking sections cooperating with said conveyors.

For instance, the complete conveyor might be arranged above the frying section. In this way said section together with the feeding and conveying section are simultaneously completely accessible.

I claim:

1. Automatic vending machine for cooked or fried food products, particularly for French-fried potatoes, with a conveyor provided with holders for separate portions of food products to be cooked and which is movable step by step along a closed path, and at least one heated kettle for frying fat in which dips at least one frying basket, whereby means are provided on the one hand for supplying to the frying basket the food products to be fried which are brought by the conveyor, and on the other hand for feeding the products fried in said basket inside a container to a window, in which the holders are subdivided into adjacent compartments which may each contain a portion of food product to be cooked and at least one supply funnel which is also divided into similar adjacent compartments, is provided at a level lying between the level of part at least of the conveyor and the level of the lowerlying frying kettle, whereby said last compartments are each closed underneath by a separate flap and whereby a tipping device for reversing the holders about a substantially horizontal rotating axis cooperates with the holders of that conveyor part which is located above the funnel level, whereby further means are provided for under the influence of gravity, on the one hand directing each one of the portions from a tipped holder to a corresponding funnel compartment and on the other hand, through an open flap, for bringing the concerned portion to the frying kettle, said flaps being each operatable separately according to a predetermined program.

2. Vending machine as claimed in claim 1, in which each flap is rotatable about an axis and is operated by means of a cam which acts on a lever integral with the flap and which is driven in synchronism with the conveyor.

3. Vending machine as claimed in claim 2, in which for the cams and the conveyor is provided a driving device which reverses a holder through the action of the tipping device after all of supply funnel flaps have been opened and closed again.

4. Vending machine as claimed in claim 3, in which the driving device is a stepping motor which acts on a shaft of which the cams are mounted with a relative angular displacement and which is so coupled to the conveyor that by a complete revolution of said shaft, the conveyor undergoes a movement which corresponds to the spacing between two succeeding holders, whereby the motor is so adjusted as to perform through an operating member an angular displacement which corresponds to the displacement required from the cam to open or close the corresponding flap.

5. Vending machine as claimed in claim 4, in which said motor drives the cam shaft and the conveyor.

6. Vending machine as claimed in claim 1, in which the flaps are provided with a return spring which brings said flaps automatically to the closed position as soon as the corresponding cams reach an idle position.

7. Vending machine as claimed in claim 1, in which the holders are hung freely rotatably about an horizontal axis in the conveyor which extends as such above the center of gravity of each said holders.

8. Vending machine as claimed in claim 7, in which the holders are removably mounted on the conveyor.

9. Vending machine as claimed in claim 8, in which the holders are subdivided into adjacent compartments along a direction at right angle to the planes in which the chains move.

10. Vending machine as claimed in claim 1, in which the conveyor is comprised of two closed chains cooperating with one another, each chain being movable in a vertical plane, both said planes being in parallel relationship with one another and having a determined spacing, whereby the holders hang horizontally between said chains.

11. Vending machine as claimed in claim 9, in which each holder hangs on two horizontal pins lying on the same rotating axis and which are arranged sidewise on said chains at right angle to said vertical planes, whereby the one pin is located on one of the chains and the other pin is provided on the other chain, on those sides facing one another of said vertical planes.

12. Vending machine as claimed in claim 11, in which each holder is provided on the outer side of the walls thereof facing the chains, with a projecting bearing member which is approximately in the shape of an inverted V as considered when the holder is in the normal upright position, the legs of the V which form a groove or slot enclosing said pins on the chains, and which rests freely on said pins by the location where said legs meet.

13. Vending machine as claimed in claim 1, in which the path followed by that part of the conveyor which moves above the supply funnel level, has an horizontal movement component, whereby adjacent said path is mounted the tipping device which has a fixed stop member lying below said path, on the way followed by the holders, in such a way that said holders during the displacement thereof along the path direction engage said fixed member and perform a tipping movement about the horizontal rotating axis thereof, whereby means are provided to retain the tipped holders in such position during a determined period of time so as to allow a complete emptying thereof.

14. Vending machine as claimed in claim 13, in which said means have a fixed guide member which retains the tipped holders over a determined length of the movement thereof with the conveyor, in tipped condition.

15. Vending machine as claimed in claim 14, in which the outer side walls of the holders carry a V-shaped projecting member one leg of which bears on said chain pins, rests and slides on said guide member over said determined length of movement of the corresponding holder in tipped condition.

16. Vending machine as claimed in claim 13, in which the extension of said path part with an horizontal movement component undergoes an upwardly-directed change of direction relative to said part, whereby the guide member is formed by a supporting strip which extends below said chain part and which further extends along the upwardly-curved portion thereof in such a way that the holder retained in tipped position by the supporting strip, is gradually returned during the holder rising movement, to the normal upright position.

17. Vending machine as claimed in claim 16, in which the means for retaining the holders in tipped condition over a determined movement length during the movement thereof with the conveyor, have a supporting member which is movable alog the conveyor movement direction, said supporting member lying on the upper side of that chain part with an horizontal movement component and retaining the tipped holder in such position while moving together with said holder over a determined path length as long as said tipped holder slides on the guide member, whereby a return spring brings the supporting member back to the original position thereof by the moment where the holder no more cooperates with said guide member and takes the normal upright position again.

18. Vending machine as claimed in claim 1, in which the frying basket is rotatably mounted about an horizontal axis which is located on the upper side of said frying kettle.

19. Vending machine as claimed in claim 18, in which a hammer is provided for acting upon said frying basket when the basket is rotated out of the kettle.

20. Vending machine as claimed in claim 1, in which the conveyor together with the holders is separated by a partition from the frying section containing the frying kettle.

21. Vending machine as claimed in claim 20, in which a supply opening is provided in said partition, said opening being closed by a door which is controlled in synchronism with the flaps closing the supply funnel flaps, said door only being opened together with one of said flaps.

22. Vending machine as claimed in claim 1, in which a single conveyor feeds at least two cooking or frying devices.

23. Vending machine as claimed in claim 22, in which for each frying device is provided a separate supply funnel, whereby each holder has at least one compartment corresponding to a compartment of each funnel, in such a way that it is possible at the same time and by means of one and the same holder to feed portions of food products to be fried or cooked in the various funnels.

24. Vending machine as claimed in claim 1, in which the conveyor is arranged inside a cooled room.

25. Vending machine as claimed in claim 1, in which a closed air-circulating system is provided in the frying or cooking section.

26. Vending machine as claimed in claim 1, in which above said window is provided a bottom-less shaft wherein hang said containers, whereby means are provided for feeding the containers one by one to the window where opens a chute on which the cooked or fried food products are dumped.

27. Vending machine as claimed in claim 26, in which the frying kettle is removably mounted in the cooking or frying section.

28. Vending machine as claimed in claim 1, in which is provided a control device which is energized through a switch which is for instance operated by introducing a coin, said control device synchronizing the stepping movement of the conveyor, the opening and closing of the funnel flaps, the opening and closing of the door between the conveying section and the frying section, the frying or cooking of the food products in the kettle, the rotating of the frying basket out of the kettle, and the feeding of containers to the window.

29. Vending machine as claimed in claim 1, in which a discharge chute is provided between said frying kettle and said window, said chute slanting downwards to said window, whereby means are provided for heating said discharge chute.

* * * * *

UNITED STATES PATENT OFFICE
CERTIFICATE OF CORRECTION

Patent No. 3,685,432    Dated August 22, 1972

Inventor(s) Jean Marie Mathieu Hoeberigs

It is certified that error appears in the above-identified patent and that said Letters Patent are hereby corrected as shown below:

On the cover sheet insert -- [30] Foreign Application Priority Data March 2, 1971, Belgium    100398 --.

Signed and sealed this 20th day of August 1974.

(SEAL)
Attest:

McCOY M. GIBSON, JR.
Attesting Officer

C. MARSHALL DANN
Commissioner of Patents